F. S. DICKINSON.
THERMOMETER.
APPLICATION FILED DEC. 12, 1908.
978,141.
Patented Dec. 13, 1910.
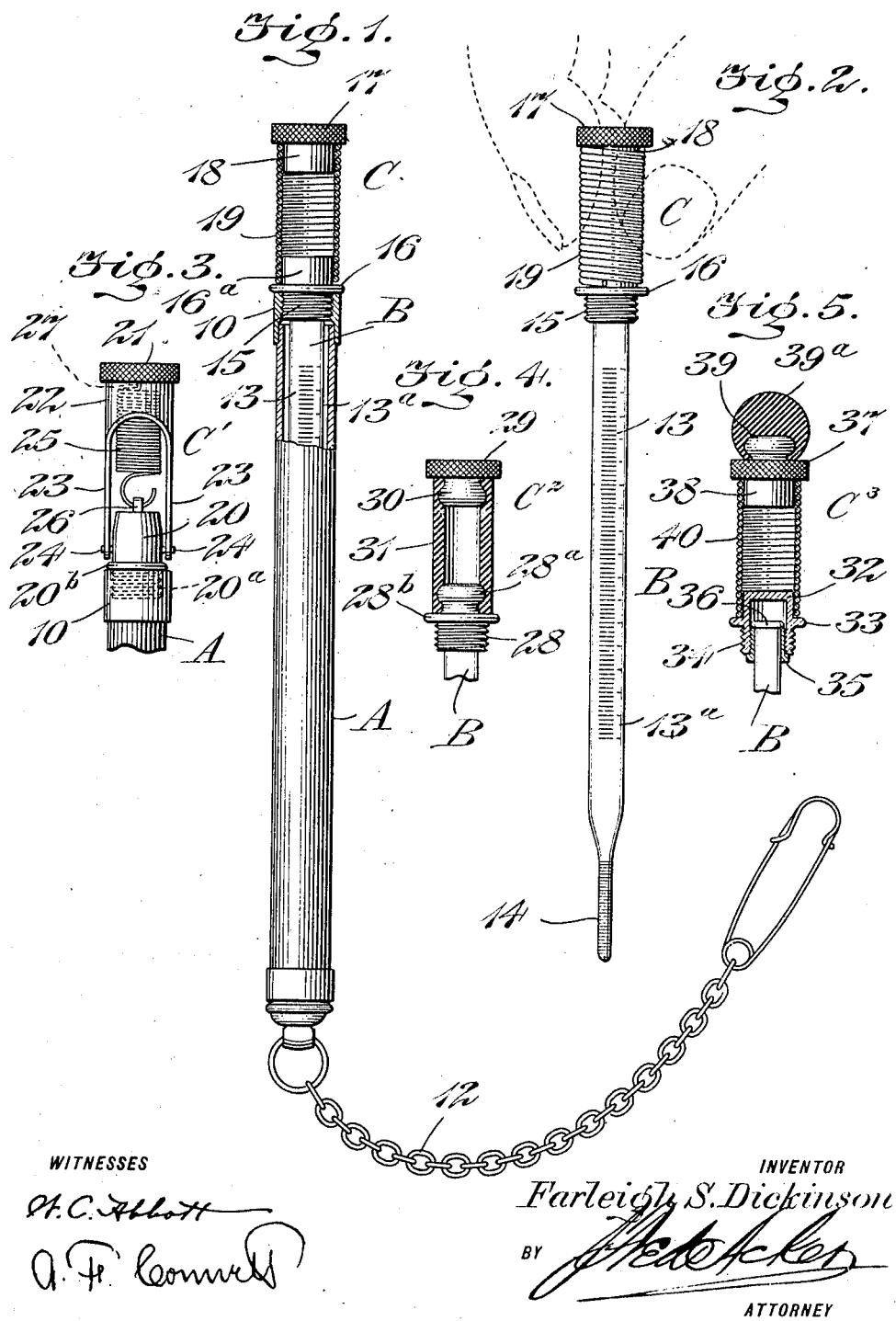

UNITED STATES PATENT OFFICE.

FAIRLEIGH S. DICKINSON, OF RUTHERFORD, NEW JERSEY.

THERMOMETER.

978,141.  Specification of Letters Patent.  Patented Dec. 13, 1910.

Application filed December 12, 1908. Serial No. 467,192.

*To all whom it may concern:*

Be it known that I, FAIRLEIGH S. DICKINSON, a citizen of the United States, residing at Rutherford, county of Bergen, and State of New Jersey, have invented certain new and useful Improvements in Thermometers, of which the following is a specification.

This invention relates to certain improvements in thermometers, and more particularly in clinical thermometers, and has for its object to provide, for use in such devices generally, means of a comparatively simple and inexpensive nature and of a novel and improved construction whereby after use of the thermometer, the mercurial column or thread thereof may be quickly and conveniently lowered without danger of breakage such as is liable to occur during the shaking required in clinical thermometers of ordinary construction for accomplishing the return of the mercurial column or thread to the cup.

The invention consists in a thermometer one end of which is provided with a handle portion or member permanently secured thereto, so as to be capable of being conveniently grasped and securely held by the hand during the manipulation of the thermometer while in use, or for the insertion of the same within its carrying case or sheath, or its withdrawal therefrom, and being so constructed and attached to the end of the thermometer that when the device is shaken in the customary fashion to return the mercurial column or thread prior to use, the thermometer is capable of a certain cushioned vibratory movement relatively to the said handle portion or member, whereby the shaking down of the mercurial column or thread is materially facilitated without liability of breaking the thermometer.

The invention also contemplates certain novel features of the construction of the improved thermometer, and combinations and arrangements of the parts thereof, whereby certain important advantages are attained, and the device is rendered simpler and less expensive, and otherwise better adapted and more convenient for use, all as will be hereinafter fully set forth.

The novel features of the invention will be carefully defined in the claims.

In order that my improvements may be the better understood, I will now proceed to describe the same with reference to the accompanying drawings, wherein—

Figure 1 is a side elevation, partly in section, showing a thermometer constructed according to my invention, the device being illustrated in connection with its carrying case or sheath; Fig. 2 is a side elevation of the device constructed in the form shown in Fig. 1, but removed from the carrying case or sheath and in position for use; Fig. 3 is a fragmentary side elevation, somewhat similar to Fig. 2, but showing another embodiment of my invention; Fig. 4 is another fragmentary view similar to Fig. 3, and illustrating another embodiment of my improvements, and Fig. 5 is yet another fragmentary side elevation, similar to Figs. 3 and 4, and illustrating still another formation of the device comprised in my present invention.

Referring first to Figs. 1 and 2, A represents the carrying case or sheath wherein the thermometer B is adapted to be contained and housed in a well known way when not required for use. As herein shown, this sheath or carrying case A is provided with an attaching chain 12 whereby it may be attached to the clothing, and is provided at its open end with an interiorly threaded sleeve or furrule 10, adapted for detachable screw connection with an exteriorly threaded plug or collar 15 cemented or otherwise secured upon the upper extremity of the thermometer tube, and which serves not merely to retain the thermometer in position when inserted in said sheath or case, but also serves as a closure for the open upper end of said sheath or case to retain the thermometer in place therein. The present invention is not, however, limited to a case or sheath of this peculiar formation, nor in fact to the employment of an inclosing case or sheath of any description, although thermometers provided with my improvements present certain features of advantage and novelty which render them peculiarly well adapted for employment with such carrying cases or sheaths.

The glass thermometer tube B, as herein illustrated, is of the conventional type, being provided, at its end opposite to the plug or collar 15, with a mercury cup or bulb 14, from which the mercurial column or thread 13ª is extended in a well known way, and having a graduated scale 13 whereon the temperature may be read. The plug or collar 15, being cemented upon the extremity of the thermometer tube in a permanently connected fashion, constitutes a substantial part of said tube, and as herein shown, said plug or collar is provided with an annular flange 16, extended around it, and affording a shoulder adapted for accurate contact against the end of the case or sheath A when the plug or collar is screwed within the sleeve or ferrule 10 thereof. Being permanently connected with one extremity of the thermometer tube B, the plug or collar 15 affords means for the permanent connection of a resilient handle portion or member C with that end of the tube wherewith said plug or collar 15 is connected, such handle portion or member C comprising, as shown in Figs. 1 and 2, a coil 19 of spring wire one end whereof is permanently secured upon the neck portion 16ª produced upon the plug or collar 15 above the shoulder 16, while the opposite end of said spring wire coil 19 is secured upon a neck portion 18 produced upon a knurled or milled head or enlargement 17 adapted to be securely grasped in the fingers of the user. By this arrangement of the parts, the upper end of the portion or member C affords a convenient and secure handle by means of which the instrument may be conveniently grasped in order that it may be inserted within the carrying case A, or manipulated during use, the member C projecting beyond the threaded ferrule 10 of the case when the instrument is sheathed therein so as to facilitate its insertion and removal, and the resilient yielding or flexible connection of said member C with the thermometer tube B afforded by the lower end of the spring coil 19 affords a convenient means whereby the tube may be vibrated or shaken after use in such a manner as to quickly and effectively return the mercurial thread or column to a lowered position without excessive swinging of the arm of the user and without liability of dropping the instrument or striking the same upon surrounding objects. The resilience of the flexible or yielding connection afforded by the lower end of the spring coil 19 between the member C and the thermometer tube effectively prevents excessive movement of the tube B relatively to the handle member during shaking down of the instrument, whereby said tube is prevented from being broken by striking upon the hand of the user, and such resilience of said spring coil also assures the return of the handle member into alinement with the tube B, and thereby facilitates the use of the device.

From the above description it will be seen that the improved theremometer constructed according to my invention is of an extremely simple and comparatively inexpensive nature, and is particularly well adapted for use by reason of the readiness with which it may be shaken down, and of the convenience and facility with which it may be handled, and it will also be evident that the device is susceptible of some modification without material departure from the principles and spirit of the invention and for this reason I do not desire to be understood as limiting myself to the precise formation and arrangement of the several parts of the device as herein set forth in carrying out my invention in practice. In certain cases, for example, the device may be embodied in the form shown in Fig. 3 with good results. In this construction the plug or collar 15 at the upper end of the thermometer tube has its upwardly directed neck portion provided with pivot pins 24, 24 at diametrically opposite sides of its peripheral surface, these pins being pivotally engaged with the extremities of forks 23, 23 carried on the handle member C¹ and spaced so as to fit at opposite sides of said neck portion of the plug. A spiral spring 25 has its upper end secured within the upper end of the handle member, which is made cylindrical as indicated at 22 to receive said upper end of the spring within it, the lower end of the spring being connected as shown at 26 with the neck portion of plug 15 so that its tension is exerted to retain the tube B normally alined with the handle member while permitting flexure at the pivotal connection between the parts when the thermometer is shaken down.

In Fig. 4 I have shown still another arrangement of the handle member comprised in my present invention, wherein the plug or collar at the upper end of the thermometer tube, indicated at 28, has an enlargement 28ª provided upon its upwardly extended neck portion, said enlargement being adapted to be securely engaged within the lower end of a rubber or other flexible and resilient tube 31, the upper end whereof is engaged over a corresponding enlargement 30 produced upon the neck portion of a milled or knurled head 29. The upper part of the member C² so constructed affords a handle adapted to be securely held by the fingers, while the lower part of the tube 31 affords a resilient flexible connection with the thermometer tube permitting cushioned swinging or vibratory movement of the tube while being shaken down.

The construction shown in Fig. 5 is quite similar to that shown in Figs. 1 and 2, excepting that the plug 34 is not rigidly connected with the upper end of the thermometer tube B, but has a bore or chamber 32 provided within it wherein the extremity of said tube B is adapted for a certain limited extent of endwise sliding movement, said end of the tube having a head 36 which engages a ferrule or bushing 35 secured at the mouth of said chamber 32 in such a way as to prevent removal of the thermometer tube from the cap or plug 34. In this construction the milled or knurled head 37 at the upper end of the handle member has an upwardly directed neck portion provided with an enlargement 39 over which is sprung a recessed cushion 39ª therein shown as made in spherical form from rubber or the like and adapted to prevent breakage of the instrument in case the same be dropped.

Having thus described my invention, what I claim and desire to secure by Letters Patent is—

1. A thermometer having a tube, a plug secured at one end thereof and a resilient handle member projecting from and permanently secured to said plug and including a spring which permits flexure of the handle member relative to the tube, said plug being provided with means to hold said handle member against longitudinal movement with relation to the tube.

2. In a thermometer, the combination of a carrying case open at one end, a tube insertible therein and having a plug to detachably engage the open end of the case, and a resilient handle member permanently connected with the plug and including a spring which permits flexure of the handle member relative to the tube, said plug being provided with means to hold said handle member against longitudinal movement with relation to the tube, said handle member being exterior of the carrying case when the tube is inserted therein.

3. A thermometer having a tube, a plug carried thereby, a handle member pivoted to the plug, and means for holding said handle member normally alined with the tube, but permitting flexure at the pivotal connection between the parts.

4. A thermometer having a tube, a handle member pivotally carried by said tube, and means for holding said handle member normally alined with the tube but permitting flexure at the pivotal connection between the parts.

In witness whereof I have hereunto signed my name this 23rd day of October 1908, in the presence of two subscribing witnesses.

FAIRLEIGH S. DICKINSON.

Witnesses:
 J. FRED. ACKER,
 MORRIS FLOREA.